(12) United States Patent
Hur et al.

(10) Patent No.: US 8,820,501 B2
(45) Date of Patent: Sep. 2, 2014

(54) PUMPING DEVICE FOR VEHICLE SEAT CUSHION

(75) Inventors: Yoon-Ho Hur, Seoul (KR); Jae-Won Sim, Daejeon-Shi (KR)

(73) Assignee: Daewon Precision Industrial Co., Ltd., Gyeonggi-do (KR)

( * ) Notice: Subject to any disclaimer, the term of this patent is extended or adjusted under 35 U.S.C. 154(b) by 317 days.

(21) Appl. No.: 13/510,792

(22) PCT Filed: Feb. 1, 2010

(86) PCT No.: PCT/KR2010/000584
§ 371 (c)(1),
(2), (4) Date: May 18, 2012

(87) PCT Pub. No.: WO2011/071211
PCT Pub. Date: Jun. 16, 2011

(65) Prior Publication Data
US 2012/0273319 A1    Nov. 1, 2012

(30) Foreign Application Priority Data
Dec. 11, 2009  (KR) .......................... 10-2009-0123103

(51) Int. Cl.
*F16D 67/02* (2006.01)
*B60N 2/16* (2006.01)
*F16B 1/04* (2006.01)
*F16H 31/00* (2006.01)

(52) U.S. Cl.
CPC . *B60N 2/167* (2013.01); *F16B 1/04* (2013.01); *F16D 67/02* (2013.01); *B60N 2/168* (2013.01); *F16H 31/002* (2013.01)
USPC .............................. 192/15; 192/19; 192/223.2

(58) Field of Classification Search
CPC ...... F16D 67/02; B60N 2/4435; B60N 2/444; B60N 2/505; F16H 31/002; F16B 1/04
USPC ........................................... 192/15, 19, 223.2
See application file for complete search history.

(56) References Cited

U.S. PATENT DOCUMENTS

| 7,032,731 | B2 * | 4/2006 | Kim ................................ 192/15 |
| 8,109,373 | B2 * | 2/2012 | Paing et al. ..................... 192/15 |
| 2005/0006193 | A1 | 1/2005 | Kim | |

FOREIGN PATENT DOCUMENTS

JP         2002045254         2/2002
(Continued)

OTHER PUBLICATIONS

International Search Report—PCT/KR2010/000584 dated Dec. 29, 2010.

*Primary Examiner* — Edwin A Young
*Assistant Examiner* — Colby M Hansen
(74) *Attorney, Agent, or Firm* — Rabin & Berdo, P.C.

(57) ABSTRACT

A pumping device for a vehicle seat cushion, which rotates a link gear mounted to the seat cushion as an actuating lever is rotated, thereby controlling the height of the seat cushion. This pumping device generates a uniform clutch force at the same position at all times and prevents undesired movement of the actuating lever so that the actuating lever can be located at the regular position at all times. In addition, when operating the actuating lever in the same direction continuously, the pumping device can minimize the degree of angle at which the actuating lever idles, so that the pumping device can improve the controllability of the actuating lever, thereby effectively transmitting the operating force of the actuating lever to the link gear. Therefore, this invention causes the user inconvenience and improves the quality of the vehicle seat, and remarkably improves assemblability and productivity of the pumping device.

7 Claims, 11 Drawing Sheets

(56) References Cited

FOREIGN PATENT DOCUMENTS

| | | |
|---|---|---|
| JP | 2004338426 | 12/2004 |
| KR | 100722849 | 5/2007 |
| KR | 100784620 | 12/2007 |
| KR | 100921849 | 10/2009 |

* cited by examiner

PUMPING DEVICE FOR VEHICLE SEAT CUSHION

TECHNICAL FIELD

The present invention relates, in general, to a pumping device for vehicle seat cushions and, more particularly, to a pumping device for vehicle seat cushions which is installed in a vehicle seat cushion and rotates a link gear of a vehicle seat cushion in response to a rotation of an actuating lever, thereby adjusting the height of the vehicle seat cushion.

BACKGROUND ART

Hereinbelow, the problems experienced in a conventional technique relating to the present invention will be described.

Vehicle seats function to maintain sitting postures of vehicle passengers and are typically divided into separate seats, which are designed to allow one person to sit thereon and are installed in the front section of the passenger compartment of a vehicle, thereby forming a driver's seat and a front passenger seat, and bench-type seats or multi-row seats that are designed to allow several persons to sit thereon and are installed in the rear section of the passenger compartment.

The vehicle seat includes: a metal frame that forms a frame of the seat; a seat cushion that covers the frame and comes into contact with the body of a passenger so that, in addition to supporting the body of the passenger and maintaining the posture of the passenger, the seat cushion allows the passenger to feel comfortable; and a seat back.

The vehicle seat is located on a seat rail, which includes a lower rail that is mounted to the floor of a car body and an upper rail that is coupled to the lower rail in such a way that the upper rail can slide along the lower rail to adjust the location of the seat. To adjust the height of the seat cushion, there is provided a seat height adjusting device, in which a link unit is provided in the seat rail and an adjusting handle is provided outside the seat, wherein the link unit is connected to the handle so that the height of the seat cushion can be adjusted.

FIG. 1 is a view schematically illustrating a conventional seat height adjusting device. Hereinbelow, the conventional seat height adjusting device will be described with reference to FIG. 1.

As shown in FIG. 1, the conventional seat height adjusting device 1 includes: a pinion gear 10 that is engaged with a link gear (not shown); a guide unit 20, one end of which is inserted into a shaft hole 100 of the pinion gear 10 and is connected thereto; a sub-spring 30 that is interposed between the outer circumferential surface of a lever connector 200 of the guide unit 20 and the inner circumferential surface of a holding part 201 of the guide unit 20; a brake spring 40 that is fitted over the outer circumferential surface of the holding part 201 of the guide unit 20; and a brake drum 50, in a depressed central portion of which the guide unit 20 having both the sub-spring 30 and the brake spring 40 is seated, and which is provided in the central portion thereof with a shaft hole 500 for receiving the lever connector 200 of the guide unit 20.

In the conventional seat height adjusting device 1 having the above-mentioned construction, there is provided an actuating lever (not shown) that has a dial-type structure. When the actuating lever is actuated in one direction, the lever connector 200 that is connected to the actuating lever is rotated in the same direction so that the guide unit 20 is rotated in the same direction. When the guide unit 20 is rotated in one direction as described above, the pinion gear 10 that is connected to the end of the guide unit 20 is rotated in the same direction and actuates the link gear (not shown) so that the height of the seat cushion can be adjusted.

Here, opposite ends of the brake spring 40 are hooked by opposite sides of the holding part of the guide unit 20, respectively, so that when the guide unit 20 is rotated in the direction as described above, either end of the brake spring 40 is pulled by the holding part of the guide unit 20 and, accordingly, the brake spring 40 is compressed inwards and the outer diameter of the brake spring 40 is reduced. Therefore, no frictional force is generated between the brake spring 40 and the inner circumferential surface of the brake drum 50 so that both the guide unit 20 and the pinion gear 10 can be rotated in the same direction and can adjust the height of the seat cushion.

On the contrary, when an external force is applied to the pinion gear 10, a biasing protrusion 101, which is provided on the pinion gear 10 and is placed between the opposite ends of the brake spring 40, pushes one of the opposite ends of the brake spring 40 in a direction in which the outer diameter of the brake spring 40 increases. Therefore, a frictional force is generated between the brake spring 40 and the inner circumferential surface of the brake drum 50 so that a braking force is generated and fixes the location of the seat cushion, the height of which has been adjusted.

However, the conventional seat height adjusting device 1 produces the braking force using only the frictional force that is generated between the brake spring 40 and the brake drum 50 so that when an excessive external force is applied to the pinion gear 10 and a frictional force is generated between the brake spring 40 and the brake drum 50, the brake spring 40 may move inside the brake drum 50 due to the excessive external force and may not firmly fix the location of the seat cushion, the height of which has been adjusted. This causes an occupant to frequently manipulate the actuating lever so as to repeatedly adjust the height of the seat cushion, thereby causing the occupant inconvenience.

Further, the excessive external force that is applied to the pinion gear 10 may easily deform or break the brake spring 40. The deformed or broken brake spring 40 may fail to maintain a desired and constant clearance between the brake drum 50 and the brake spring 40 so that the conventional seat height adjusting device may not realize the desired operational efficiency. Further, when a user operates the conventional seat height adjusting device using the actuating lever, the operational rotating force is transmitted to the pinion gear 10 through the sub-spring 30 so that the efficiency of transmitting the rotating force is too low and this causes user inconvenience.

Therefore, in an effort to solve the problems that have been experienced in the conventional seat height adjusting device, a pumping device for vehicle seat cushions has been proposed and used in recent years. In a conventional pumping device for vehicle seat cushions, a long actuating lever is repeatedly actuated upwards and downwards in a manner similar to a typical pump handle, thereby adjusting the height of the seat cushion and causing the user convenience when using the pumping device.

However, the conventional pumping device is problematic in that, when the user operates the pumping device so as to adjust the height of the seat cushion, an excessive amount of loss occurs in the operating amounts of both a brake unit and a clutch unit that are important parts of the pumping device, so that the effective upward or downward movement amount of the seat cushion is less than the manipulating amount of the user.

This prevents the manipulating force of the user that acts on the actuating lever from being efficiently transmitted to the link gear, thereby forcing the user to unnecessarily repeat the manipulation of the actuating lever and deteriorating the quality of the vehicle seats.

DISCLOSURE

Technical Problem

Accordingly, the present invention has been made keeping in mind the above problems occurring in the related art, and is intended to provide a pumping device for vehicle seat cushions, which can always generate a constant clutching force at the same position and can prevent an actuating lever from being undesirably moved, and in which, when the actuating lever is continuously operated in the same direction, it is possible to minimize the degree of angle at which the actuating lever runs idle, so that the operating force of the actuating lever can be efficiently transmitted to a link gear and which can remarkably improve assemblability and productivity of the pumping device.

Technical Solution

In an aspect, the present invention provides a pumping device for a vehicle seat cushion, which is used to adjust a height of the vehicle seat cushion, the pumping device including: a brake unit including: a brake bush having a plurality of anti-rotation protrusions that protrude on an outer circumferential surface of the brake bush and are inserted into hooking slots of an inner cover so as to be fixed to the hooking slots; a pinion shaft having a pinion gear on a first side thereof and passing both through a central portion of the brake bush and through a through hole of the inner cover so as to be exposed outside the inner cover; a brake cam installed on a second side of the pinion shaft and having a plurality of anti-rotation protrusions that protrude on an outer circumferential surface of the brake cam; a plurality of brake rollers placed between outer circumferential surfaces of the anti-rotation protrusions and an inner circumferential surface of the brake bush; a brake spring fitted over the second side of the pinion shaft through a central portion thereof and having a plurality of elastic support pieces that are provided on an outer circumferential surface of the brake spring and are inserted between the anti-rotation protrusions of the brake cam so as to elastically support the brake rollers; and an anti-instantaneous rotation member connected both to the pinion shaft and to the brake cam so as to be rotated in conjunction with both the pinion shaft and the brake cam and having an outer circumferential surface that is brought into close contact with the inner circumferential surface of the brake bush so as to form a predetermined frictional force between the surfaces; a clutch unit including: a clutch bush fitted over the second side of the pinion shaft through a central portion thereof, with power transmitting protrusions protruding on a first surface of the clutch bush and having respective steps on inner surfaces thereof and being inserted between the brake rollers, and with a collar protruding from an outer edge of a second surface of the clutch bush so as to form a receiving depression therein; a clutch cam seated in the receiving depression in such a way that the clutch cam is fitted over a second side of the brake cam through a central portion thereof, the clutch cam having a plurality of clutch guide surfaces that protrude on an outer circumferential surface of the clutch cam, with power transmitting flat parts being formed in opposite sides of each of the clutch guide surfaces and with a lever connector protruding on a second surface of the clutch cam; a plurality of clutch rollers placed between an inner circumferential surface of the collar of the clutch bush and the outer circumferential surface of the clutch cam so as to be brought into contact with the clutch guide surfaces; a plurality of clutch springs placed between the power transmitting flat parts and the inner circumferential surface of the collar of the clutch bush so as to elastically support the clutch rollers; and a retainer fitted over the second side of the pinion shaft through a central portion thereof and having rotating protrusions that are formed on a first surface of the retainer in such a way that the rotating protrusions are spaced apart from each other at regular intervals and are inserted between the clutch rollers so as to support the clutch rollers by opposite side surfaces thereof, with a receiving slot being formed on an upper end of a rim of the retainer and with a pair of hooking pieces protruding in a central portion of the receiving slot so as to be placed inside support jaws of the inner cover; a lever bracket having a fitting hole in a central portion thereof, in which the central portion of the lever bracket passes through the central portion of the retainer and the fitting hole is connected to the lever connector of the clutch cam, with hooking pieces being formed on an upper end of the lever bracket by being bent so as to be placed outside the support jaws of the inner cover; a return spring having opposite ends that are inserted into the receiving slot of the retainer so as to be supported by the support jaws of the inner cover, so that first parts of the opposite ends of the return spring are held by the hooking pieces of the retainer and second parts of the opposite ends of the return spring are held by the hooking pieces of the lever bracket; a wave washer interposed between the second surface of the clutch cam and a first surface of the lever bracket in such a way that a central portion of the wave washer is fitted over the lever connector of the clutch cam; and an outer cover fitted over the pinion shaft through a central portion thereof and having opposite flanges that are mounted to opposite flanges of the inner cover, thereby maintaining a concentricity of the pinion shaft.

Here, the anti-instantaneous rotation member may include: a through hole that is formed through a central portion of the anti-instantaneous rotation member and is fitted over the pinion gear of the pinion shaft; a plurality of elastic hooks that are formed on a first surface of the anti-instantaneous rotation member and are inserted between the outer circumferential surface of the brake cam and the steps that are formed on the inner surfaces of the power transmitting protrusions of the clutch bush; and support protrusions that protrude between the elastic hooks so as to support inner surfaces of the elastic support pieces of the brake spring.

Further, each of the opposite ends of the return spring may be slit into two parts, in which first parts of the slit opposite ends of the return spring are bent and form respective lever bracket supports that hold the hooking pieces of the lever bracket and are held by the support jaws of the inner cover, and second parts of the slit opposite ends of the return spring are bent and form respective retainer supports that hold the hooking pieces of the retainer and are held by the support jaws of the inner cover, in which the retainer supports are shorter than the lever bracket supports so as to be free from interfering with the hooking pieces of the lever bracket.

Further, the retainer supports may further include respective steps.

Further, each of the rotating protrusions of the retainer may be configured in such a way that a width between opposite side surfaces of the rotating protrusion gradually increases in a direction from an inner circumferential surface to an outer circumferential surface of the rotating protrusion.

Further, the power transmitting flat parts of the clutch cam may be configured in such a way that a width of each of the power transmitting flat parts gradually increases in directions toward the clutch guide surfaces so that each of the power transmitting flat parts forms a V-shaped appearance.

Further, the power transmitting protrusions of the clutch bush may be configured in such a way that a width between opposite side surfaces of each of the power transmitting protrusions gradually increases in a direction from an inner surface to an outer surface.

The pumping device for vehicle seat cushions according to the present invention is advantageous in that when the lever bracket is actuated to operate the pumping device, the two clutch rollers that are elastically biased by each clutch spring are operated in such a way that one clutch roller that is placed in the rotating direction of the lever bracket is supported by an associated rotating protrusion of the retainer and is retained in a stopped state until the other clutch roller that is placed in a direction opposed to the rotating direction of the lever bracket is jammed between the clutch bush and the clutch cam and generates a frictional force, so that a desired clutching force can always be generated at a predetermined position and the clutch rollers that are placed in the first sides of the clutch roller contact protrusions are brought into close contact with the power transmitting flat parts, thereby forming no gap between the clutch rollers and the power transmitting flat parts.

Further, even when the pumping device for vehicle seat cushions is not operated, the power transmitting protrusions of the clutch bush can always be retained in a state in which they are supported by the elastic hooks, so that no gap remains between the power transmitting protrusions of the clutch bush and the brake rollers. Further, when the actuating lever is actuated continuously, the power transmitting protrusions of the clutch bush are biased by the elastic hooks in a rotating direction of the actuating lever, so that the first side surfaces of the power transmitting protrusions of the clutch bush can be retained in a state in which they are brought into close contact with the brake rollers, thereby reducing the gap between the power transmitting protrusions of the clutch bush and the brake rollers by a space D that is defined between the first side surfaces of the power transmitting protrusions of the clutch bush and the brake rollers that are placed in the second sides of the elastic support pieces.

Therefore, the pumping device for vehicle seat cushions of this invention is advantageous in that the actuating lever is free from being undesirably moved and there is no part that is located in a freely movable position, so that it is possible to reduce the noise that may be generated by vibrations and to minimize the amount of rotating loss, thereby improving the operational efficiency of the pumping device and efficiently transmitting the rotating force of the actuating lever to the link gear, allowing a user to easily and efficiently manipulate the pumping device, and improving the quality of the vehicle seats.

Further, another advantage of the pumping device for vehicle seat cushions according to the present invention resides in that both the retainer and the lever bracket can be supported at the same time using one return spring, thereby improving the assemblability and productivity of the pumping device.

Figure 1:
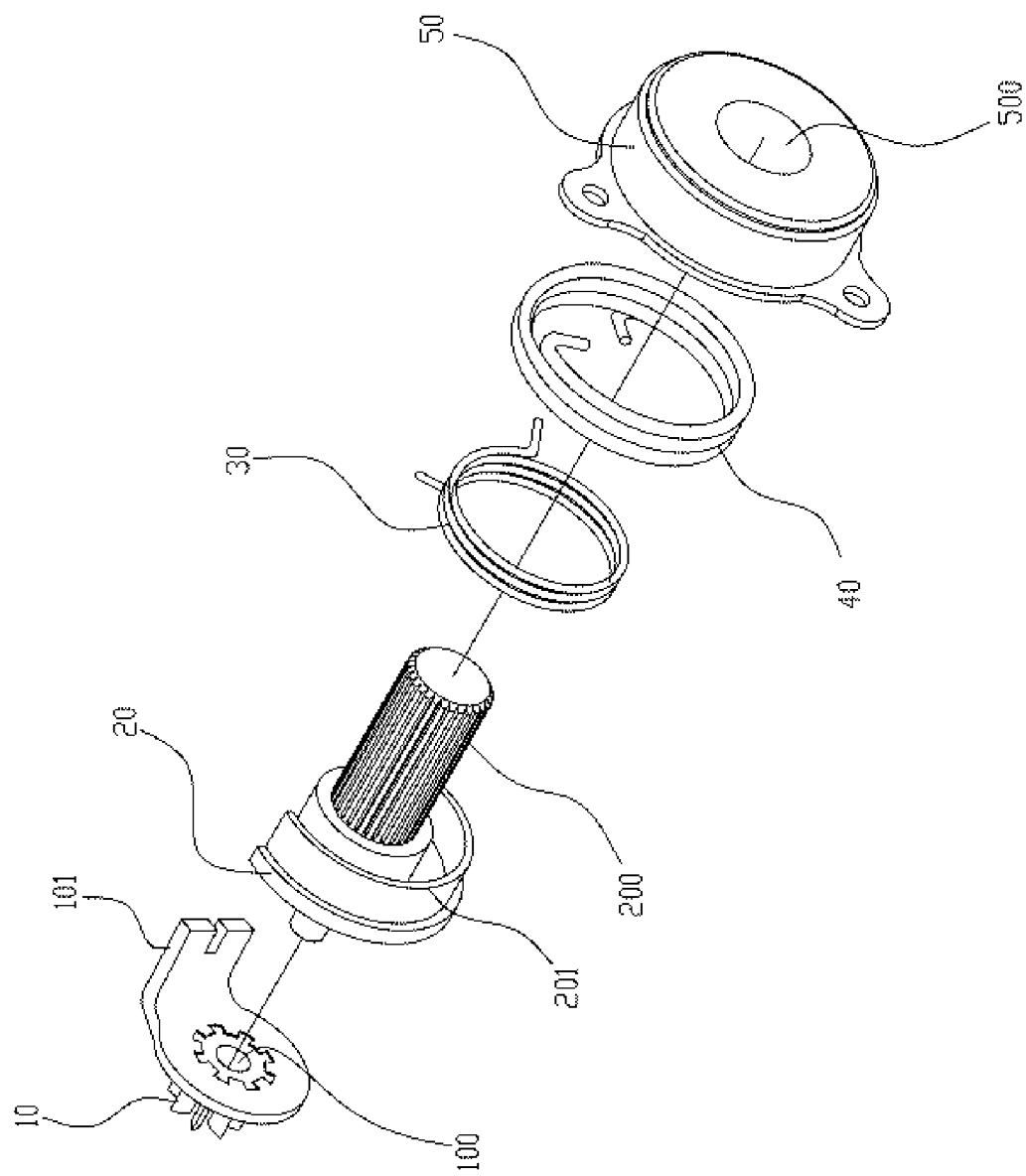
FIG. 1 is a view illustrating a conventional seat height adjusting device.

| <Description of reference characters of important parts> | |
|---|---|
| 10: inner cover | 11: brake unit |
| 12: clutch unit | 13: retainer |
| 14: lever bracket | 15: return spring |
| 16: outer cover | 18: wave washer |

MODE FOR INVENTION

Hereinbelow, a preferred embodiment of the present invention will be described in detail with reference to the accompanying drawings.

Figure 2:
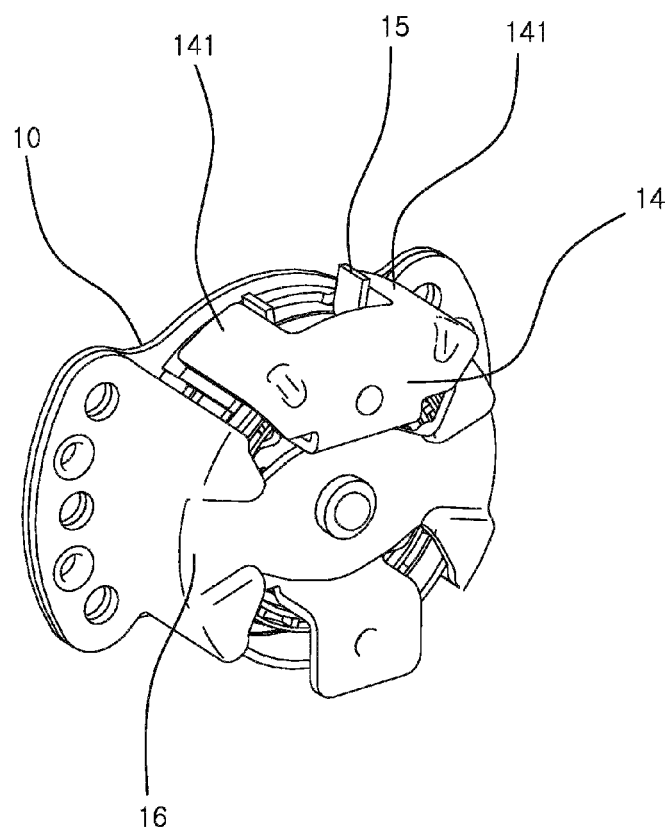
FIG. 2 is a perspective view of a pumping device for vehicle seat cushions according to the present invention.
Figure 3:
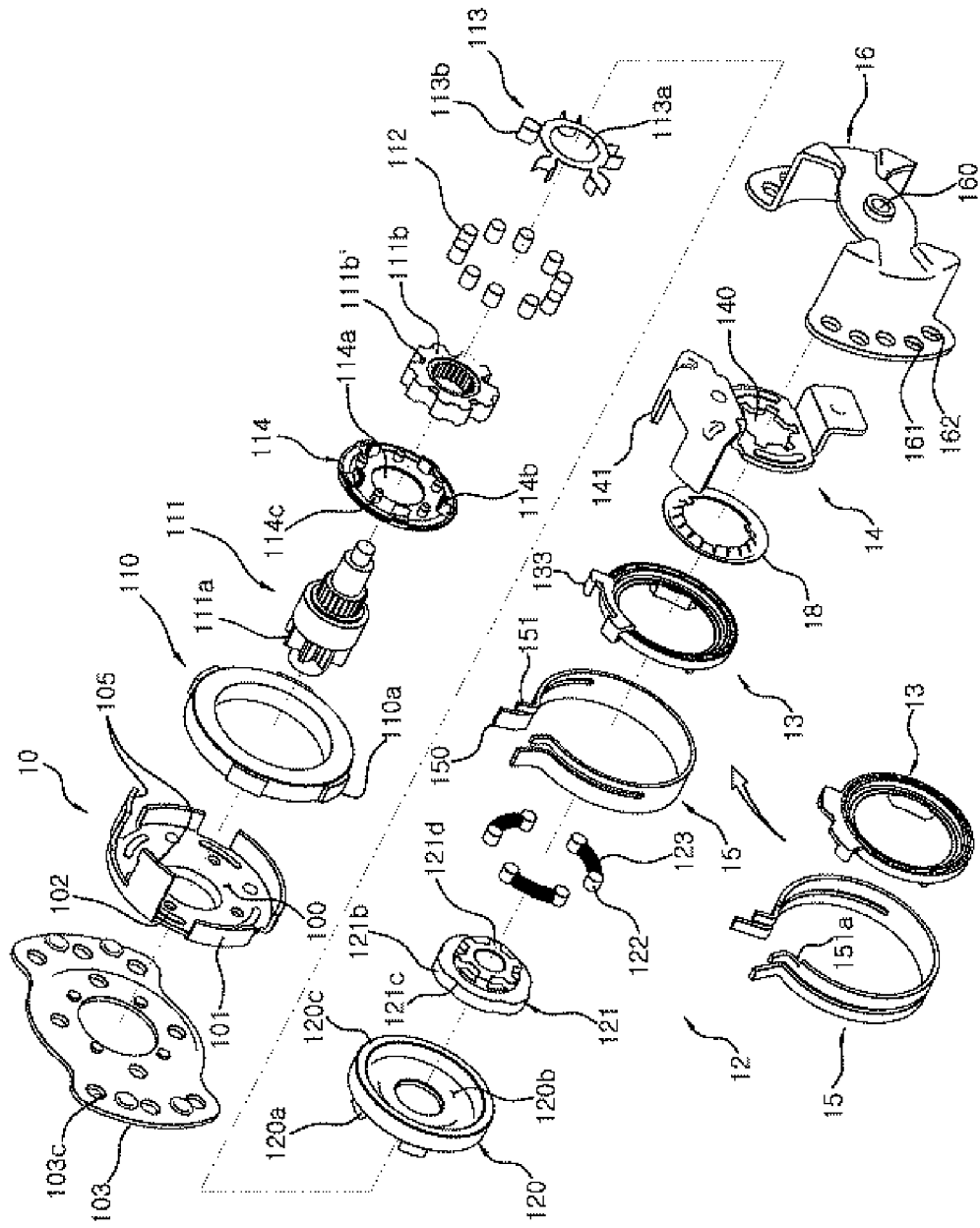
FIG. 3 is an exploded perspective view of FIG. 2.
Figure 4:
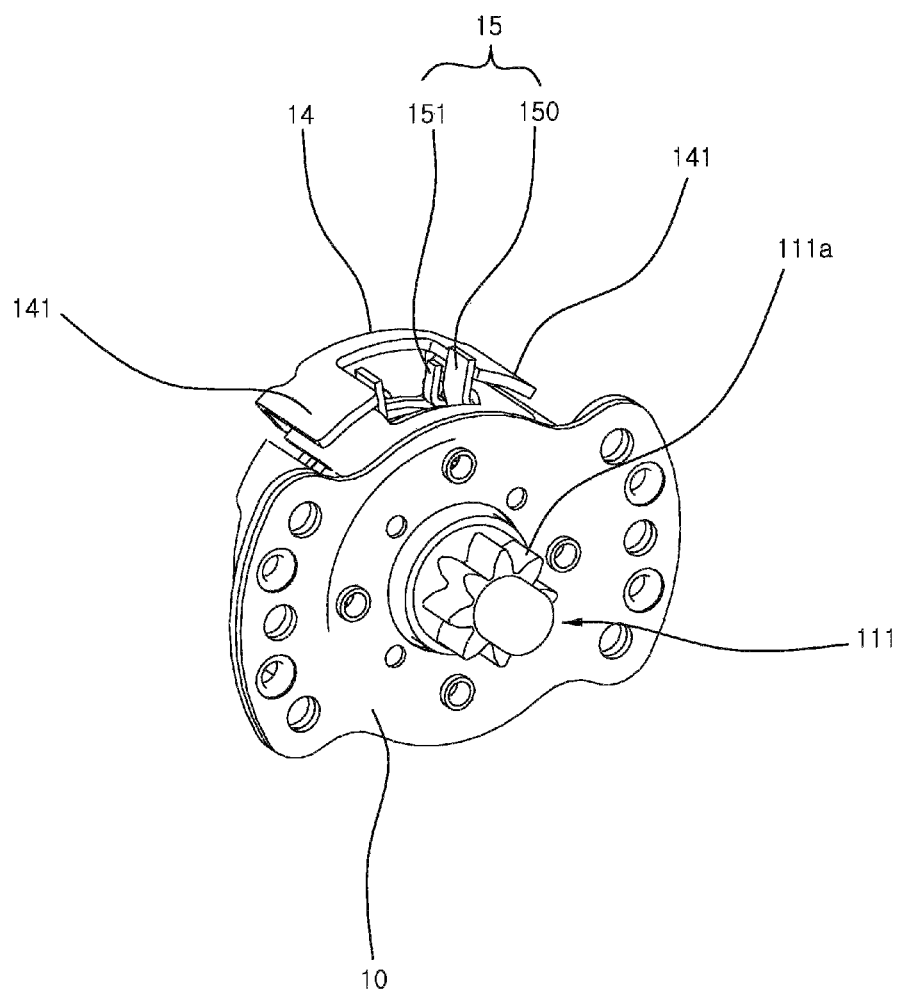
FIG. 4 is another perspective view of the pumping device for vehicle seat cushions according to the present invention.
Figure 5:
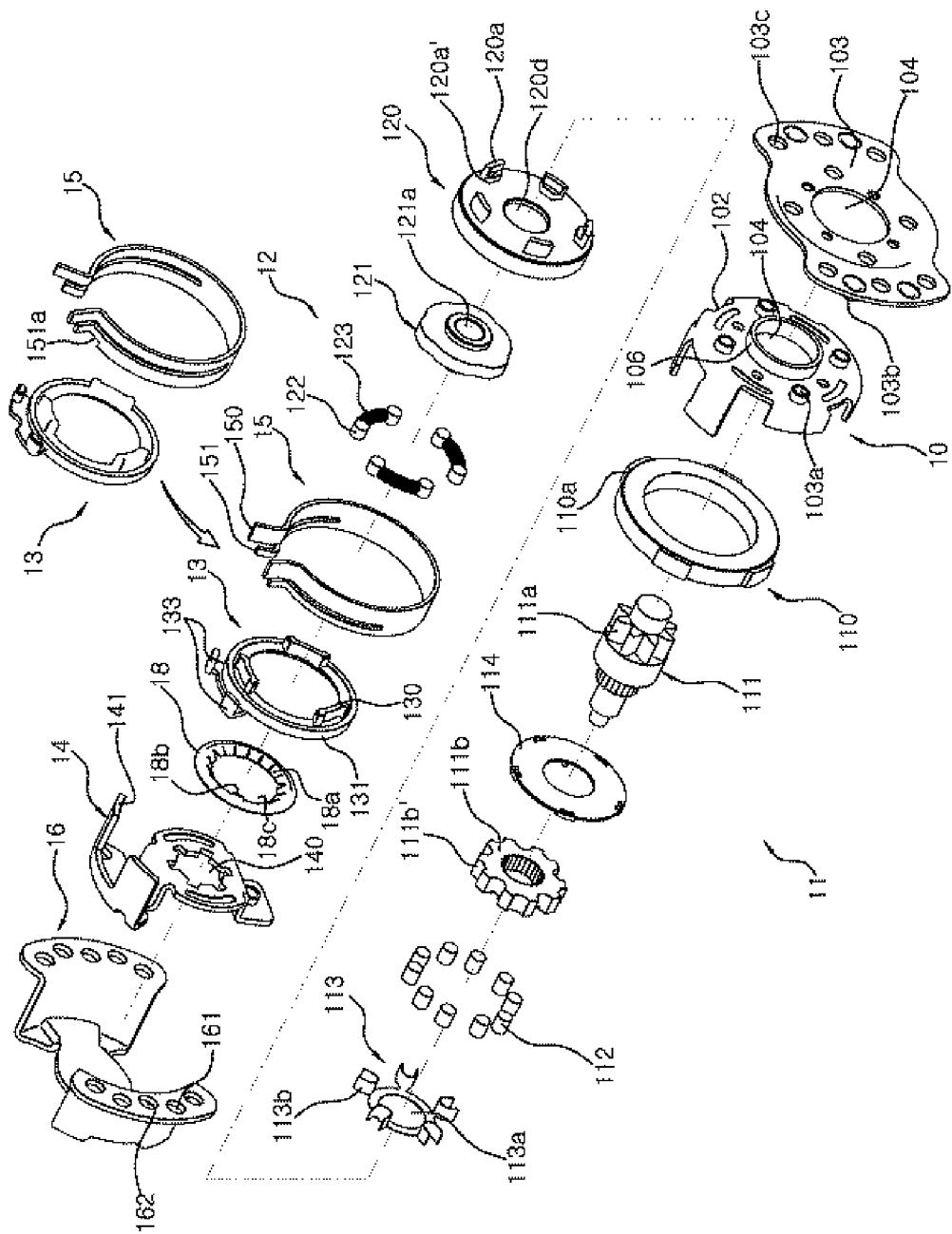
FIG. 5 is an exploded perspective view of FIG. 4.

FIG. 2 is a perspective view of a pumping device for vehicle seat cushions according to the present invention, FIG. 3 is an exploded perspective view of FIG. 2 and FIG. 4 is another perspective view of the pumping device for vehicle seat cushions according to the present invention. FIG. 5 is an exploded perspective view of FIG. 4, FIGS. 6 through 9 are views illustrating the operation of a clutch unit and FIGS. 10 through 13 are views illustrating the operation of a brake unit.

As shown in FIGS. 2 through 13, the pumping device for vehicle seat cushions according to the present invention includes an inner cover 10, a brake unit 11, a clutch unit 12, a lever bracket 14, a return spring 15 and an outer cover 16.

In the pumping device for vehicle seat cushions having the above-mentioned construction according to the present invention, the inner cover 10 has a collar 101 that extends from the edge of a second surface of the inner cover and defines a receiving depression 100 therein on the second surface, with a plurality of hooking slots 102 being formed in the collar 101 in such a way the hooking slots 102 are spaced apart from each other at regular intervals. On a first surface of the inner cover, a plurality of compressive locking protrusions 103a protrude so that a locking bracket 103 is locked to the inner cover by the compressive locking protrusions 103a. A through hole 104 is formed through the central portion of the inner cover so as to communicate with the locking bracket 103. A flange 106 is formed around the edge of the through hole 104 of the inner cover and is inserted into a through hole 104 of the locking bracket 103. A pair of support jaws 105 extend from predetermined portions of the end of the collar 101. Further, a plurality of compressive locking protrusions 103b are formed on opposite sides of the locking bracket 103 and a plurality of rivet holes 103c are formed through the locking bracket 103 in such a way that the rivet holes 103c are spaced apart from each other at regular intervals in a circumferential direction so that the locking bracket can be mounted to a vehicle seat.

The brake unit 11 includes a brake bush 110, a pinion shaft 111, a brake cam 111b, a plurality of brake rollers 112, a brake spring 113 and an anti-instantaneous rotation member 114.

Here, the brake bush 110 of the brake unit 11 has an annular ring shape having a rectangular cross-section. On the outer circumferential surface of the brake bush 110, a plurality of anti-rotation protrusions 110a are formed such that the protrusions 110a are angularly spaced apart from each other at regular intervals. The anti-rotation protrusions 110a can be inserted into respective hooking slots 102 of the inner cover 10.

In the pinion shaft 111, a pinion gear 111a and a brake cam 111b are provided on first and second sides of the pinion shaft 111, respectively, with a plurality of anti-rotation protrusions 111b' being formed on the outer circumferential surface of the brake cam 111b. Here, the pinion gear 111a passes through both the central opening of the brake bush 110 and the through hole 104 of the inner cover 10 and is exposed outside the inner cover 10, and is thereafter connected to a link gear (not shown).

The brake rollers 112 are placed between the inner circumferential surface of the brake bush 110 and the outer circumferential surfaces of the neighboring anti-rotation protrusions 111b' that are formed on the outer circumferential surface of the brake cam 111b.

A through hole 113a is formed in the central portion of the brake spring 113, and a plurality of elastic support pieces 113b are formed around the outer edge. Here, the elastic support pieces 113b are angularly spaced apart from each other at regular intervals. The elastic support pieces 113b are inserted between the anti-rotation protrusions 111b' and elastically support the brake rollers 112. The through hole 113a of the brake spring 113 is fitted over the second end of the pinion shaft 111. Here, it is preferred that each of the elastic support pieces 113b of the brake spring 113 be configured in the form of a U-shaped cross-section.

The anti-instantaneous rotation member 114 is connected both to the pinion shaft 111 and to the brake cam 111b so that the anti-instantaneous rotation member 114 can be operated in conjunction with both the pinion shaft 111 and the brake cam 111b. Here, the outer circumferential surface of the anti-instantaneous rotation member 114 is brought into close contact with the inner circumferential surface of the brake bush 110 so as to form a predetermined frictional force between them.

Described in detail, the anti-instantaneous rotation member 114 has a through hole 114a that is formed in the central portion of the member 114 and receives the pinion shaft 111 therein. On a surface of the anti-instantaneous rotation member 114, a plurality of elastic hooks 114b protrude so as to be inserted into gaps between the outer circumferential surface of the brake cam 111b of the brake unit 11 and steps 120a' that are formed on respective inner surfaces of power transmitting protrusions 120a of a clutch bush 120 that will be described later herein. Further, support protrusions 114c protrude on the surface of the anti-instantaneous rotation member 114 at locations between neighboring elastic hooks 114b so as to support the inner surfaces of the elastic support pieces 113b.

The clutch unit 12 includes the clutch bush 120, a clutch cam 121, a plurality of clutch rollers 122, a plurality of clutch springs 123 and a retainer 13.

In the clutch unit 12 having the above-mentioned construction, the clutch bush 120 has a through hole 120d that is formed through the central portion of the clutch bush 120 so that the pinion shaft 111 can pass through the through hole 120d. On a surface of the clutch bush 120, the power transmitting protrusions 120a that protrude at regular intervals and are provided on inner surfaces thereof with respective steps 120a' so as to be inserted into the gaps between the neighboring brake rollers 112 are formed. Further, a collar 120c is formed along the edge of an opposite surface of the clutch bush 120 so that a receiving depression 120b is defined inside the collar 120c.

Here, it is preferred that the power transmitting protrusions 120a be configured in such a way that the width between opposite side surfaces of each power transmitting protrusion 120a gradually increases in a direction from the inner surface to the outer surface of the protrusion 120a.

The clutch cam 121 is provided with a through hole 121a and is seated in the receiving depression 120b of the clutch bush 120 so that the second end of the pinion shaft 111 can pass through the through hole 121a. Further, a plurality of clutch guide surfaces 121b are formed around the outer circumferential surface of the clutch cam 121 by protruding so that the clutch guide surfaces 121b can control the positions of the clutch springs 123. Power transmitting flat parts 121c are formed on opposite sides of each of the clutch guide surfaces 121b so that the clutch rollers 122 can be brought into contact with the clutch guide surfaces 121b in opposite directions. Further, a lever connector 121d protrudes on a second surface of the clutch cam 121.

Here, it is preferred that the width of each of the power transmitting flat parts 121c gradually increases in directions toward the neighboring clutch guide surfaces 121b so that each of the power transmitting flat parts 121c forms a V-shaped appearance.

The plurality of clutch rollers 122 are interposed between the inner circumferential surface of the collar 120c of the clutch bush 120 and the outer circumferential surface of the clutch cam 121 so that the clutch rollers 122 can be brought into contact with the power transmitting flat parts 121c of the clutch cam 121.

Further, the plurality of clutch springs 123 are interposed between the outer circumferential surfaces of the clutch guide surfaces 121b of the clutch cam 121 and the inner circumferential surface of the collar 120c of the clutch bush 120 so that the clutch springs 123 can elastically support the clutch rollers 122.

In the retainer 13, a plurality of rotating protrusions 130 protrude on a surface of a rim 131 in such a way that the rotating protrusions 130 are spaced apart from each other at regular intervals, and a pair of hooking pieces 133 protrude on the upper end of the rim 131. Here, each of the rotating protrusions 130 is inserted between a pair of neighboring clutch rollers 122 so that opposite side surfaces of each of the rotating protrusions 130 can support the pair of neighboring clutch rollers 122.

Further, it is preferred that each of the rotating protrusions 130 be configured in such a way that the width between opposite side surfaces of the rotating protrusion 130 gradually increases in a direction from the inner circumferential surface to the outer circumferential surface of the rotating protrusion 130.

The lever bracket 14 has a fitting hole 140 that is formed through a central portion of the lever bracket 14. Further, hooking pieces 141 are formed on the upper end of the lever bracket 14 by being bent in such a way that the hooking pieces 141 can be placed outside the support jaws 105 of the inner cover 10. Here, the lever connector 121d of the clutch cam 121 is inserted into the fitting hole 140 of the lever bracket 14 after the lever connector 121d passes through the retainer 13.

Opposite ends of the return spring 15 are inserted between the pair of hooking pieces 133 of the retainer 13 so that the opposite ends of the return spring 15 can be held by the support jaws 105 of the inner cover 10. Here, first parts of the opposite ends of the return spring 15 are held by the hooking pieces 133 of the retainer 13, and second parts of the opposite ends of the return spring 15 are held by the hooking pieces 141 of the lever bracket 14.

Described in detail, each end of the return spring 15 is slit into two parts, in which first parts of the slit opposite ends of the spring 15 are bent and form respective lever bracket supports 150 that hold the hooking pieces 141 of the lever bracket 14 and are held by the support jaws 105 of the inner cover 10. Further, second parts of the slit opposite ends of the spring 15 are bent and form respective retainer supports 151, which hold the hooking pieces 133 of the retainer 13 and are held by the support jaws 105 of the inner cover 10. Here, it is preferred that the retainer supports 151 be shorter than the lever bracket supports 150 so as to be free from interfering with the hooking pieces 141 of the lever bracket 14.

Further, steps 151a are formed in respective retainer supports 151 of the return spring 15 so that the lower parts of the hooking pieces 133 of the retainer 13 can be inserted into the steps 151a. Therefore, when the retainer 13 is assembled with the return spring 15, it is possible to reduce the thickness of the assembly, thereby reducing the thickness of the outer cover 16.

In the outer cover 16, a through hole 160 is formed through the central portion of the outer cover 16 so as to be fitted over the second end of the pinion shaft 111. Further, a plurality of locking holes 161 are formed through each of opposite flanges of the outer cover 16 so that the compressive locking protrusions 103b of the locking bracket 103 can be inserted into the locking holes 161 of the outer cover 16. In each flange of the outer cover 16, mounting holes 162 are formed in the same manner as in the locking bracket 103 so that When the compressive locking protrusions 103b of the locking bracket 103 are inserted into the locking hole 161 of the outer cover 16 and are compressed, the outer cover 16 can be attached to a seat together with the inner cover 10. Therefore, both the outer cover 16 and the locking bracket 103 can be mounted to the seat and this increases the locking force of the pumping device that is mounted to the seat.

Further, a wave washer 18 may be interposed between the second surface of the clutch cam 121 and the first surface of the lever bracket 14 in such a way that a through hole that is formed through the central portion of the wave washer 18 is fitted over the lever connector 121d of the clutch cam 121.

Around the through hole 18c that is formed through the central portion of the wave washer 18, a plurality of elastic pieces 18a are formed so as to generate an axial elastic force. Guide parts 18b are formed between the plurality of elastic pieces 18a so that when the guide parts 18b are held by the clutch cam 121, it is possible to maintain the concentricity between the wave washer 18 and the clutch cam 121.

The wave washer 18 biases the clutch cam 121 in a direction toward the clutch bush 120 so that the clutch cam 121 can be brought into close contact with the clutch bush 120. Further, the wave washer 18 biases the lever bracket 14 in a direction toward the outer cover 16 so that no gap remains between the clutch bush 120 and the clutch cam 121. Here, as described above, the clutch cam 121 is biased by the wave washer 18 in the direction toward the clutch bush 120 so that the clutch cam 121 can be brought into close contact with the receiving depression 120b of the clutch bush 120 at a predetermined position, thereby holding both the clutch rollers 122 and the clutch springs 123 without allowing their operating positions to be changed and, accordingly, maintaining the operational performance of the clutch unit 12.

Hereinbelow, the operation of the pumping device for vehicle seat cushions according to the present invention will be described, with reference to FIGS. 2 through 13.

Here, the operation for lifting up a seat cushion (not shown) using the pumping device for vehicle seat cushions according to the present invention is the same as the operation for lowering the seat cushion except for the operating directions that are opposite to each other, so that only the operation for lifting up the seat cushion will be described hereinbelow.

Figure 6:
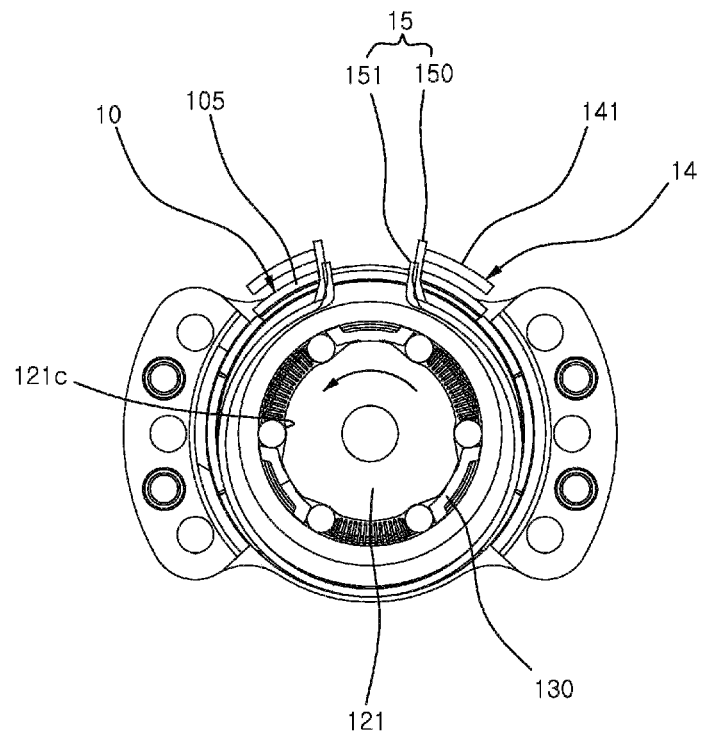
FIGS. 6 through 9 are views illustrating the operation of a clutch unit.

To lift up the seat cushion, the actuating lever (not shown) is rotated so as to rotate the lever bracket 14 that is connected to the actuating lever in a counterclockwise direction, as shown in FIG. 6, so that the clutch cam 121 that is connected to the lever bracket 14 can be rotated in the counterclockwise direction.

In the above state, the first lever bracket support 150 that is provided in the first end of the return spring 15 is pushed in the counterclockwise direction by an associated hooking piece 141 of the lever bracket 14 and the second lever bracket support 150 that is provided in the second side of the return spring 15 is stopped by an associated support jaw 105 of the inner cover 10 so that the first lever bracket support 150 of the return spring 15 is compressed by the hooking piece 141 of the lever bracket 14.

Figure 7:
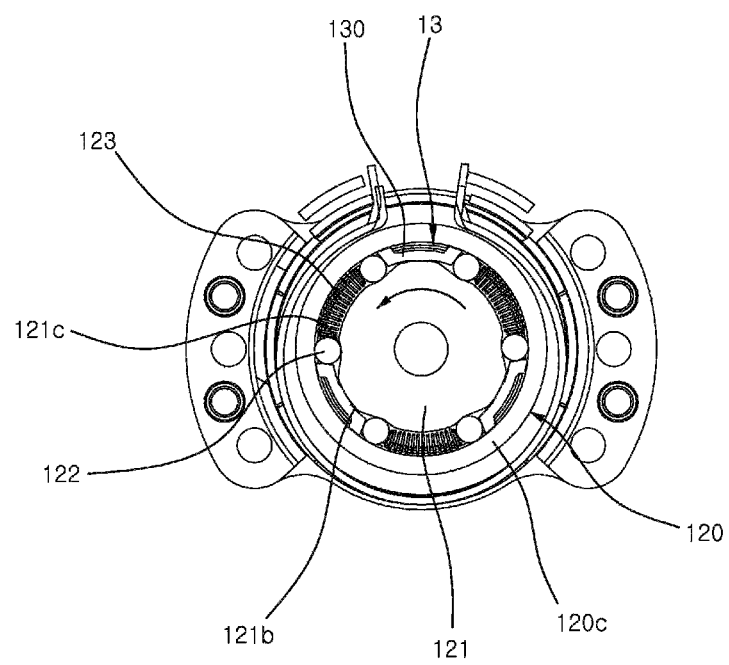

When the clutch cam 121 that is connected to the lever bracket 14 is rotated counterclockwise in response to the counterclockwise rotation of the lever bracket 14 as described above, the clutch rollers 122 that are placed in the second sides of the clutch guide surfaces 121b of the clutch cam 121 are pushed in directions toward the inner circumferential surface of the collar 120c of the clutch bush 120 by the power transmitting flat parts 121c of the clutch cam 121, as shown in FIG. 7. Therefore, the clutch rollers 122 that are placed in the second ends of the clutch springs 123 are jammed between the power transmitting flat parts 121c of the clutch cam 121 and the inner circumferential surface of the collar 120c of the clutch bush 120, thereby generating a frictional force between them and transmitting the rotating force of the clutch cam 121 to the clutch bush 120 by the clutch rollers 122. Accordingly, the clutch bush 120 that is operated in conjunction with the clutch cam 121 is rotated counterclockwise and, in the above state, the clutch springs 123, each of which elastically supports two clutch rollers 122, are compressed by the clutch rollers 122 that are placed in the second sides of the clutch guide surfaces 121b of the clutch cam 121.

When both the clutch cam 121 and the clutch bush 120 in the above state are rotated further counterclockwise at a predetermined degree of angle, the clutch rollers 122 that are placed in the first sides of the clutch roller contact protrusions 121b are pushed by the first side surfaces of the power transmitting flat parts 121c of the clutch cam 121, thereby being rotated counterclockwise. In the above state, the clutch rollers 122 that are placed in the second sides of the clutch guide surfaces 121b are rotated counterclockwise.

Here, before the clutch rollers 122 are pushed and rotated by the power transmitting flat parts 121c, the elastic force of the clutch springs 123 that elastically support the clutch rollers 122 is smaller that the elastic force of the retainer supports 151 of the return springs 15 that elastically support the hooking pieces 133 of the retainer 13 (see FIG. 5), so that the retainer 13 is not rotated but the clutch cam 121, the clutch rollers 122, the clutch springs 123 and the clutch bush 120 are rotated counterclockwise.

Figure 8:
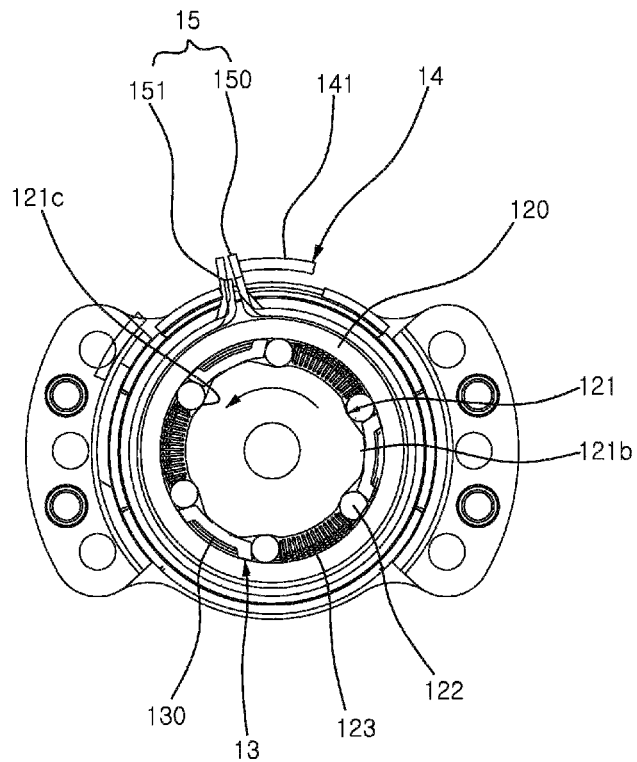

When the clutch rollers 122 that are placed in the first sides of the clutch guide surfaces 121b are pushed and rotated by the power transmitting flat parts 121c as described above, the rotating force of the clutch cam 121 that has been transmitted to the clutch rollers 122 is transmitted to the rotating protrusions 130 of the retainer 13. Therefore, as shown in FIG. 8, the clutch cam 121, the clutch rollers 122, the clutch springs 123 and the clutch bush 120 in the above state are operated in conjunction with each other so that the retainer 13 is rotated counterclockwise and, accordingly, the first retainer support 151 that is placed in the first end of the return spring 15 is pushed and compressed by an associated hooking piece 133 of the retainer 13 (see FIG. 5).

As described above, in the pumping device for vehicle seat cushions according to the present invention, before the rotating force of the clutch cam 121 is directly transmitted to the rotating protrusions 130 of the retainer 13 by the clutch rollers 122 that are placed in the first sides of the clutch guide surfaces 121b, the elastic force of the retainer support 151 that elastically supports the hooking piece 133 of the retainer 13 is larger than the elastic force of the clutch springs 123, so that even when the clutch cam 121, the clutch rollers 122, the clutch springs 123 and the clutch bush 120 are rotated counterclockwise, the retainer 13 is not rotated. However, when the rotating force of the clutch cam 121 is directly transmitted to the rotating protrusions 130 of the retainer 13 by the clutch rollers 122 that are placed in the first ends of the clutch springs 123, the retainer 13 is rotated counterclockwise in conjunction with the clutch cam 121, the clutch rollers 122, the clutch springs 123 and the clutch bush 120. Therefore, the clutching force can be generated at a predetermined position and the clutch rollers 122 that are placed in the first sides of the clutch guide surfaces 121b can always be brought into close contact with the power transmitting flat parts 121c, so that no gap remains between the clutch rollers 122 and the power transmitting flat parts 121c which prevents the actuating lever (not shown) from being undesirably moved.

In other words, each end of the return spring 15 is slit into the lever bracket support 150 and the retainer support 151, in which the lever bracket support 150 independently supports an associated hooking piece 141 of the lever bracket 14 and the retainer support 151 independently supports an associated hooking piece 133 of the retainer 13. Therefore, the lever bracket support 150 of the return spring 15 that supports the hooking piece 141 of the lever bracket 14 can be compressed by the hooking piece 141 of the lever bracket 14 that can be rotated in the initial stage of the operation. However, in the initial stage of the operation (before the rotating protrusions 130 of the retainer 13 are pushed by the clutch rollers 122 that are placed in the first ends of the clutch springs 123), the retainer support 151 of the return spring 15 that supports the hooking piece 133 of the retainer 13 is not rotated. However, when the rotating protrusions 130 of the retainer 13 are pushed by the clutch rollers 122 that are placed in the first ends of the clutch springs 123, the retainer 13 is rotated and the retainer support 151 of the return spring 15 can be compressed by the hooking piece 133 of the retainer 13 so that a difference in the compressed state between the lever bracket support 150 and the retainer support 151 of the return spring 15 is generated. Therefore, in the initial stage of the operation of the actuating lever, the clutch rollers 122, which are placed in the first ends of the clutch springs 123, are supported by the rotating protrusions 130 of the retainer 13 that are supported by the retainer supports 151 so as to not be rotated, so that the clutching force can be reliably generated at the predetermined position.

Figure 10:
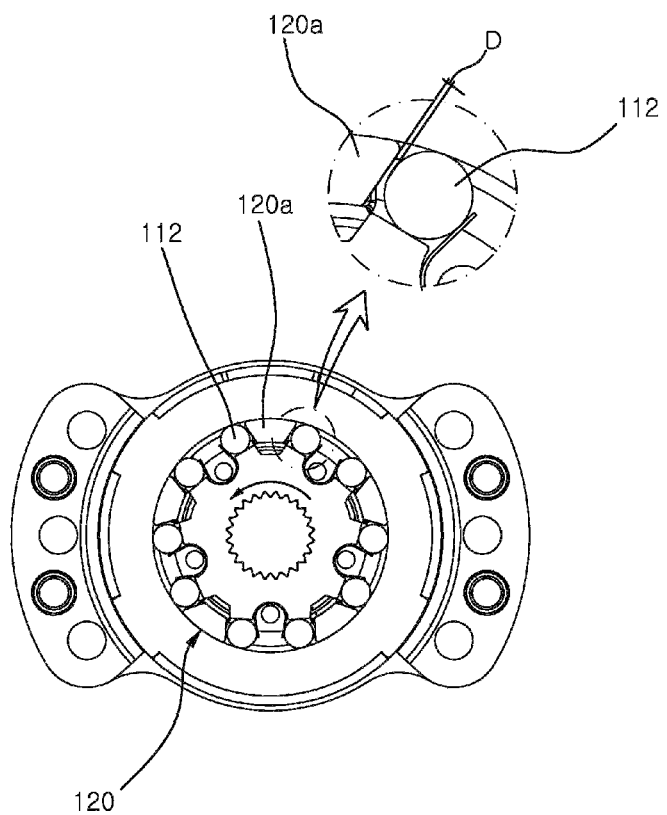
FIGS. 10 through 13 are views illustrating the operation of a brake unit.

Further, as shown in FIG. 6, before the clutch rollers 122 that are placed in the second ends of the clutch springs 123 are jammed between the power transmitting flat parts 121c of the clutch cam 121 and the inner circumferential surface of the collar 120c of the clutch bush 120, the rotating force of the clutch cam 12 is not transmitted to the clutch bush 120, so that the brake unit 11 is not operated, but maintains the braking force, as shown in FIG. 10.

Figure 11:
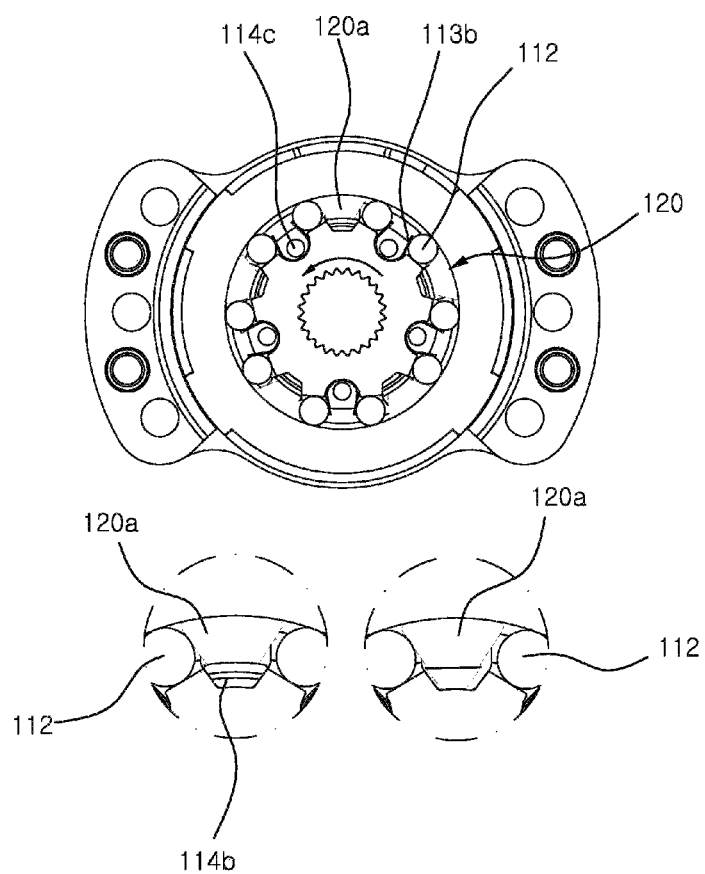
Figure 12:
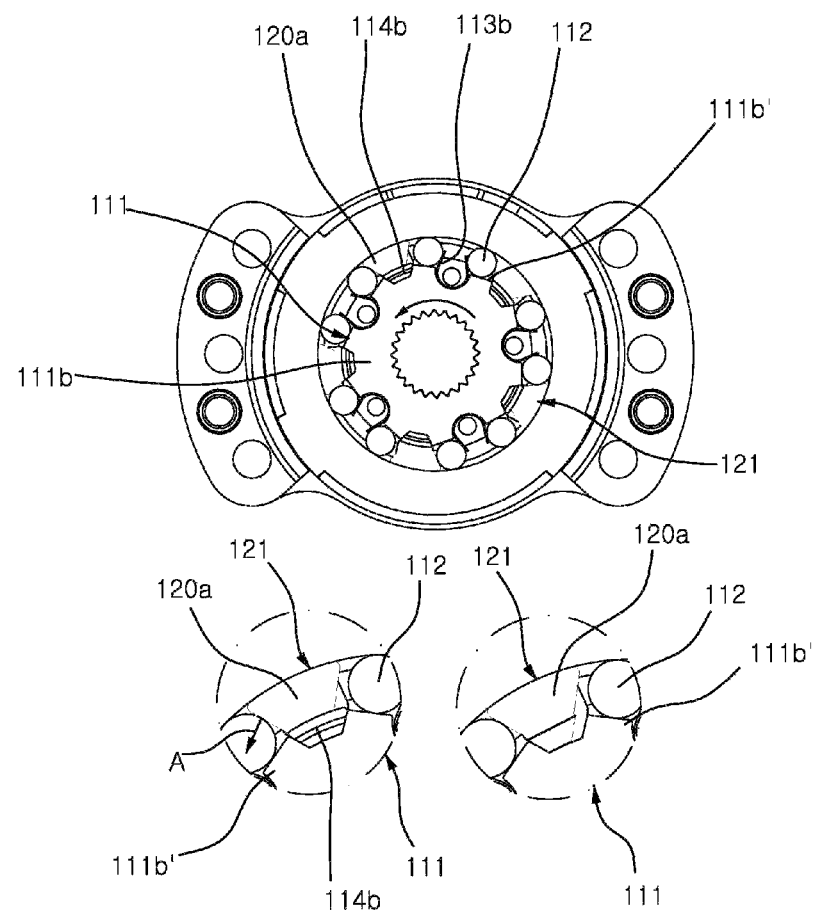

Further, when the rotating force of the clutch cam 121 is transmitted to the clutch bush 120 by the clutch rollers 122 and the clutch bush 120 is rotated counterclockwise at a predetermined degree of angle in conjunction with the clutch cam 121 as shown in FIG. 7, the first side surfaces of the power transmitting protrusions 120a of the clutch bush 120 come into contact with the brake rollers 112 that are placed in the second sides of the elastic support pieces 113b, as shown in FIG. 11. When the power transmitting protrusions 120a of the clutch bush 120 in the above state are rotated further counterclockwise as shown in FIG. 12, the brake rollers 112 that are placed in the second sides of the elastic support pieces 113b are pushed and moved by the first side surfaces of the power transmitting protrusions 120a of the clutch bush 120 in directions A that are perpendicular to tangent lines between the power transmitting protrusions 120a and the brake rollers 112. Here, each of the power transmitting protrusions 120a is configured in such a way that the width between opposite side surfaces thereof is gradually increased in the direction from the inner circumferential surface to the outer circumferential surface. In the above state, the brake rollers 112 that are placed in the second sides of the elastic support pieces 113b are spaced apart from the inner circumferential surface of the brake bush 110, so that the braking force of the brake rollers 112 that are placed in the second sides of the elastic support pieces 113b is released, and at the same time, the second sides of the elastic support pieces 113b are biased in directions toward the center by the brake rollers 112 that are placed in the second sides of the elastic support pieces 113b.

When the braking force of the brake rollers 112 that are placed in the second sides of the elastic support pieces 113b is released and, at the same time, the first side surfaces of the power transmitting protrusions 120a of the clutch bush 120 come into contact with the second sides surfaces of the anti-rotation protrusions 111b' of the brake cam 111b, both the anti-rotation protrusions 111b' of the brake cam 111b and the brake rollers 112 that are placed in the second sides of the elastic support pieces 113b are pushed counterclockwise by the power transmitting protrusions 120a of the clutch bush 120, so that both the brake cam 111b and the brake rollers 112 that are placed in the second sides of the elastic support pieces 113b are rotated counterclockwise in conjunction with the clutch bush 120. However, in the above state, the brake rollers 112 that are placed in the first sides of the elastic support pieces 113b are intended to rotate clockwise due to the frictional force that is generated between the brake rollers 112 and the brake bush 110, so that the brake rollers 112 bias the first sides of the elastic support pieces 113b and the frictional force is released. Therefore, as shown in FIG. 12, the brake rollers 112 are rotated counterclockwise in conjunction with the brake cam 111b and the pinion shaft 111 (see FIG. 3) is rotated in the same direction, so that the link gear (not shown) that is coupled to the pinion gear 111a (see FIG. 3) of the pinion shaft 111 is rotated and lifts up the seat cushion.

In the above state, the elastic hooks 114b of the anti-instantaneous rotation member 114 elastically support the steps 120a' of the power transmitting protrusions 120a, so that the power transmitting protrusions 120a are elastically biased counterclockwise.

Further, when the brake cam 111b is rotated counterclockwise by the power transmitting protrusions 120a as described above, the elastic hooks 114b that are placed between the anti-rotation protrusions 111b' of the brake cam 111b are pushed counterclockwise by the anti-rotation protrusions 111b' so that the anti-instantaneous rotation member 114 is rotated counterclockwise in conjunction with the brake cam 111b. In the above state, a predetermined frictional force is generated between the outer circumferential surface of the anti-instantaneous rotation member 114 and the inner circumferential surface of the brake bush 110, thereby preventing the pinion shaft 111 from being abruptly rotated by the weight of the seat and improving the lever manipulation performance.

As shown in FIG. 12, the clutch cam 121 in the above state is rotated further counterclockwise so that the brake cam 111 is rotated further counterclockwise in conjunction with the clutch cam 121. Therefore, the link gear (not shown) that is coupled to the pinion gear 111a (see FIG. 3) of the pinion shaft 111 is rotated further counterclockwise, thereby further lifting up the seat cushion.

Figure 9:
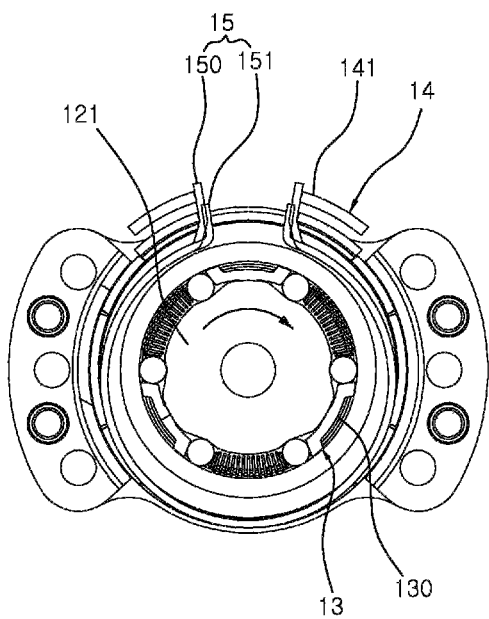

When the counterclockwise actuating force is released from the lever bracket 14 after the seat cushion has been lifted up as described above, as shown in FIG. 13, the brake rollers 112 that are placed in the first sides of the elastic support pieces 113b are rotated counterclockwise due to the restoring force of the compressed elastic support pieces 113b. Therefore, in the above state, the brake rollers 112 that are placed in the second sides of the elastic support pieces 113b are rotated clockwise, so that the brake rollers 112 are jammed between the inner circumferential surface of the brake bush 110 and the outer circumferential surfaces of the anti-rotation protrusions 111b' of the brake cam 111b (see FIG. 3) of the pinion shaft 111, thereby generating a braking force. Accordingly, the brake cam 111 is not rotated, but is retained in a stopped state and, at the same time, both the hooking pieces 141 of the lever bracket 14 and the hooking pieces 133 (see FIG. 5) of the retainer 13 are pushed clockwise due to the restoring force of both the lever bracket support 150 and the retainer support 151 of the return spring 15 as shown in FIG. 9, so that the lever bracket 14 and the retainer 13 can be rotated clockwise at the same time, thereby being returned to original positions thereof.

As described above, the retainer 13 is rotated clockwise and, at the same time, as shown in FIGS. 6 through 9, the clutch rollers 122 that are placed in the first sides of the clutch roller contact protrusions 121b are pushed clockwise and are compressed toward the power transmitting flat parts 121c by the second side surfaces of the rotating protrusions 130 of the retainer 13 that are configured in such a way that the width between opposite side surfaces of the rotating protrusions 130 are gradually increased in the direction from the inner circumferential surface to the outer circumferential surface. In the above state, the clutch rollers 122 that are placed in the first sides of the clutch guide surfaces 121b are spaced apart from the inner circumferential surface of the collar 120c of the clutch bush 120 and the frictional force is released. Further, the clutch rollers 122 that are placed in the second sides of the clutch guide surfaces 121b are pushed clockwise due to the restoring force of the compressed clutch springs 123. Therefore, the clutch rollers 122 come into contact with the first side surfaces of the rotating protrusions 130 of the retainer 13 that are configured in such a way that the width between opposite side surfaces of the rotating protrusions 130 is gradually increased in the direction from the inner circumferential surface to the outer circumferential surface, so that the clutch rollers 122 are compressed in the direction toward the power transmitting flat parts 121c by the first sides surfaces of the rotating protrusions 130 of the retainer 13. Accordingly, the clutch rollers 122 that are placed in the second sides of the clutch guide surfaces 121b are spaced apart from the inner circumferential surface of the clutch bush 120 and the frictional force is released, so that the clutch cam 121 runs idle clockwise and this allows both the retainer 13 and the lever bracket 14 to be elastically returned to original positions thereof by the return spring 15 in a state in which the brake cam 111 is not rotated, but is retained in a stopped state.

Figure 13:
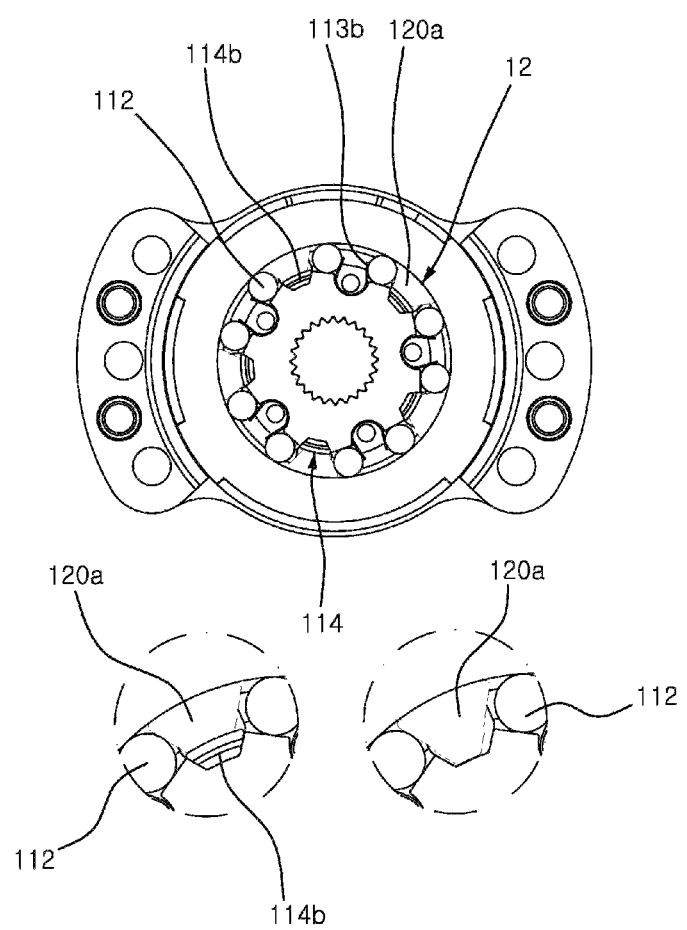

In the state in which both the retainer 13 and the lever bracket 14 are returned to the original positions thereof by the return spring 15 as described above, the second sides of the inner circumferential surfaces of the power transmitting protrusions 120a of the clutch bush 120 are biased counterclockwise by the elastic hooks 114b of the anti-instantaneous rotation member 114, as shown in FIG. 13. Therefore, the first side surfaces of the power transmitting protrusions 120a of the clutch bush 120 can be retained in a state in which they are brought into close contact with the brake rollers 112 that are placed in the second sides of the elastic support pieces 113b. Therefore, when it is required to further lift up the seat cushion by rotating the lever bracket 14 counterclockwise, the clutch bush 120 does not run idle by the space D that is formed between the first side surfaces of the power transmitting protrusions 120a of the clutch bush 120 and the brake rollers 112 that are placed in the second sides of the elastic support pieces 113b, as shown in FIG. 10, so that the present invention improves the operational efficiency of the pumping device.

Further, when the pumping device for vehicle seat cushions according to the present invention is not operated, the power transmitting protrusions 120a of the clutch bush 120 can be retained in a state in which the power transmitting protrusions 120a are always supported by the elastic hooks 114b. Therefore, no gap remains between the power transmitting protrusions 120a of the clutch bush 120 and the brake cam 111b that is coupled to the pinion shaft 111, so that the clutch bush 120 can be prevented from running idle and this remarkably reduces the operating loss of the actuating lever.

Further, in the pumping device for vehicle seat cushions according to the present invention, both the retainer 13 and the lever bracket 14 can be supported at the same time using one return spring 15, thereby improving the assemblability and productivity of the pumping device.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A pumping device for a vehicle seat cushion, which is used to adjust a height of the vehicle seat cushion, the pumping device comprising:

a brake unit comprising: a brake bush having a plurality of anti-rotation protrusions that protrude on an outer circumferential surface of the brake bush and are inserted into hooking slots of an inner cover so as to be fixed to the hooking slots; a pinion shaft having a pinion gear on a first side thereof and passing both through a central portion of the brake bush and through a through hole of the inner cover so as to be exposed outside the inner cover; a brake cam installed on a second side of the pinion shaft and having a plurality of anti-rotation protrusions that protrude on an outer circumferential surface of the brake cam; a plurality of brake rollers placed between outer circumferential surfaces of the anti-rotation protrusions and an inner circumferential surface of the brake bush; a brake spring fitted over the second side of the pinion shaft through a central portion thereof and having a plurality of elastic support pieces that are provided on an outer circumferential surface of the brake spring and are inserted between the anti-rotation protrusions of the brake cam so as to elastically support the brake rollers; and an anti-instantaneous rotation member connected both to the pinion shaft and to the brake cam so as to be rotated in conjunction with both the pinion shaft and the brake cam and having an outer circumferential surface that is brought into close contact with the inner circumferential surface of the brake bush so as to form a predetermined frictional force between the surfaces;

a clutch unit comprising: a clutch bush fitted over the second side of the pinion shaft through a central portion thereof, with power transmitting protrusions protruding on a first surface of the clutch bush and having respective steps on inner surfaces thereof and being inserted between the brake rollers, and with a collar protruding from an outer edge of a second surface of the clutch bush so as to form a receiving depression therein; a clutch cam seated in the receiving depression in such a way that the clutch cam is fitted over a second side of the brake cam through a central portion thereof, the clutch cam having a plurality of clutch guide surfaces that protrude on an outer circumferential surface of the clutch cam, with power transmitting flat parts being formed in opposite sides of each of the clutch guide surfaces and with a lever connector protruding on a second surface of the clutch cam; a plurality of clutch rollers placed between an inner circumferential surface of the collar of the clutch bush and the outer circumferential surface of the clutch cam so as to be brought into contact with the clutch guide surfaces; a plurality of clutch springs placed between the power transmitting flat parts and the inner circumferential surface of the collar of the clutch bush so as to elastically support the clutch rollers; and a retainer fitted over the second side of the pinion shaft through a central portion thereof and having rotating protrusions that are formed on a first surface of the retainer in such a way that the rotating protrusions are spaced apart from each other at regular intervals and are inserted between the clutch rollers so as to support the clutch rollers by opposite side surfaces thereof, with a receiving slot being formed on an upper end of a rim of the retainer and with a pair of hooking pieces protruding in a central portion of the receiving slot so as to be placed inside support jaws of the inner cover;

a lever bracket having a fitting hole in a central portion thereof, in which the central portion of the lever bracket passes through the central portion of the retainer and the fitting hole is connected to the lever connector of the clutch cam, with hooking pieces being formed on an upper end of the lever bracket by being bent so as to be placed outside the support jaws of the inner cover;

a return spring having opposite ends that are inserted into the receiving slot of the retainer so as to be supported by the support jaws of the inner cover, so that first parts of the opposite ends of the return spring are held by the hooking pieces of the retainer and second parts of the opposite ends of the return spring are held by the hooking pieces of the lever bracket;

a wave washer interposed between the second surface of the clutch cam and a first surface of the lever bracket in such a way that a central portion of the wave washer is fitted over the lever connector of the clutch cam; and an outer cover fitted over the pinion shaft through a central portion thereof and having opposite flanges that are mounted to opposite flanges of the inner cover, thereby maintaining a concentricity of the pinion shaft.

2. The pumping device for the vehicle seat cushion as set forth in claim 1, wherein the anti-instantaneous rotation member comprises:

a through hole that is formed through a central portion of the anti-instantaneous rotation member and is fitted over the pinion gear of the pinion shaft; a plurality of elastic hooks that are formed on a first surface of the anti-instantaneous rotation member and are inserted between the outer circumferential surface of the brake cam and the steps that are formed on the inner surfaces of the power transmitting protrusions of the clutch bush; and support protrusions that protrude between the elastic hooks so as to support inner surfaces of the elastic support pieces of the brake spring.

3. The pumping device for the vehicle seat cushion as set forth in claim 1, wherein each of the opposite ends of the return spring is slit into two parts, in which first parts of the slit opposite ends of the return spring are bent and form respective lever bracket supports that hold the hooking pieces of the lever bracket and are held by the support jaws of the inner cover, and second parts of the slit opposite ends of the return spring are bent and form respective retainer supports that hold the hooking pieces of the retainer and are held by the support jaws of the inner cover, in which the retainer supports are shorter than the lever bracket supports so as to be free from interfering with the hooking pieces of the lever bracket.

4. The pumping device for the vehicle seat cushion as set forth in claim 3, wherein the retainer supports further comprise respective steps.

5. The pumping device for the vehicle seat cushion as set forth in claim 1, wherein each of the rotating protrusions of the retainer is configured in such a way that a width between opposite side surfaces of the rotating protrusion gradually increases in a direction from an inner circumferential surface to an outer circumferential surface of the rotating protrusion.

6. The pumping device for the vehicle seat cushion as set forth in claim 1, wherein the power transmitting flat parts of the clutch cam are configured in such a way that a width of each of the power transmitting flat parts gradually increases in directions toward the clutch guide surfaces so that each of the power transmitting flat parts forms a V-shaped appearance.

7. The pumping device for the vehicle seat cushion as set forth in claim 1, wherein the power transmitting protrusions of the clutch bush are configured in such a way that a width between opposite side surfaces of each of the power transmitting protrusions gradually increases in a direction from an inner surface to an outer surface.

* * * * *